(12) United States Patent
Chikuma

(10) Patent No.: US 12,424,386 B2
(45) Date of Patent: Sep. 23, 2025

(54) MULTILAYER CERAMIC CAPACITOR

(71) Applicant: Murata Manufacturing Co., Ltd., Nagaokakyo (JP)

(72) Inventor: Shinobu Chikuma, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 207 days.

(21) Appl. No.: 18/122,843

(22) Filed: Mar. 17, 2023

(65) Prior Publication Data

US 2023/0377799 A1 Nov. 23, 2023

(30) Foreign Application Priority Data

May 18, 2022 (JP) .................................. 2022-081609

(51) Int. Cl.
- *H01G 4/232* (2006.01)
- *H01G 4/12* (2006.01)
- *H01G 4/30* (2006.01)

(52) U.S. Cl.
CPC ............. *H01G 4/2325* (2013.01); *H01G 4/30* (2013.01); *H01G 4/1227* (2013.01)

(58) Field of Classification Search
CPC ........ H01G 4/30; H01G 4/1227; H01G 4/232; H01G 4/2325; H01G 4/248
USPC ...................... 361/301.4, 321.1, 306.3, 321.3
See application file for complete search history.

(56) References Cited

U.S. PATENT DOCUMENTS

| | | | |
|---|---|---|---|
| 2014/0016242 A1* | 1/2014 | Hattori | H05K 1/181 361/303 |
| 2014/0321025 A1* | 10/2014 | Saito | H01G 4/232 205/181 |
| 2016/0088733 A1* | 3/2016 | Lee | H05K 3/3442 361/768 |
| 2017/0042029 A1 | 2/2017 | Nishimura et al. | |
| 2018/0323010 A1* | 11/2018 | Park | H01G 2/065 |
| 2019/0252121 A1* | 8/2019 | Park | H01G 2/065 |
| 2019/0287719 A1* | 9/2019 | Fujita | H01G 2/065 |
| 2020/0006004 A1* | 1/2020 | Kojima | H01G 4/232 |
| 2020/0118745 A1* | 4/2020 | Ji | H01G 4/018 |
| 2022/0108839 A1* | 4/2022 | Yokomizo | H01G 2/06 |

FOREIGN PATENT DOCUMENTS

| | | |
|---|---|---|
| WO | 2015/098990 A1 | 7/2015 |
| WO | 2018/101405 A1 | 6/2018 |

* cited by examiner

*Primary Examiner* — Arun Ramaswamy
(74) *Attorney, Agent, or Firm* — Keating & Bennett, LLP

(57) ABSTRACT

A multilayer ceramic capacitor includes a capacitor body including a stack of alternating dielectric layers and internal electrode layers, and external electrodes on both end surfaces in a length direction perpendicular or substantially perpendicular to a stacking direction of the stack and connected to the internal electrode layers, the external electrodes each including an the underlying electrode layer and a first plating layer on an outer periphery of the underlying electrode layer, and joints on one of main surfaces in the stacking direction of the capacitor body and connected to the external electrodes, the joints each mainly including a metal with a melting point of about 240° C. or higher. Second plating layers each extend continuously on an outer periphery of a corresponding one of the external electrodes and an outer periphery of a corresponding one of the joints.

18 Claims, 4 Drawing Sheets

MULTILAYER CERAMIC CAPACITOR

CROSS REFERENCE TO RELATED APPLICATIONS

This application claims the benefit of priority to Japanese Patent Application No. 2022-081609 filed on May 18, 2022. The entire contents of this application are hereby incorporated herein by reference.

BACKGROUND OF THE INVENTION

1. Field of the Invention

The present invention relates to a multilayer ceramic capacitor.

2. Description of the Related Art

Recently, there has been a demand for high-capacity, small-sized multilayer ceramic capacitors. Such a multilayer ceramic capacitor includes an inner layer portion where dielectric layers and internal electrodes are alternately stacked. Such a multilayer ceramic capacitor also includes dielectric layers as outer layer portions on the top and bottom of the inner layer portion, resulting in a cuboidal stack. The multilayer ceramic capacitor further includes external electrodes on both end surfaces in a longitudinal direction of the stack, resulting in a capacitor body.

Further, in order to prevent audible noise, a known multilayer ceramic capacitor includes joints made with solder as bumps on its mounting side of a capacitor body onto a substrate (see WO 2015/098990).

SUMMARY OF THE INVENTION

However, in conventional multilayer ceramic capacitors, separation of the joints from the capacitor body occurs in some cases.

Preferred embodiments of the present invention provide multilayer ceramic capacitors in each of which joints are not easily separated from the capacitor body.

A multilayer ceramic capacitor according to a preferred embodiment of the present invention includes a capacitor body including a stack of alternating dielectric layers and internal electrode layers, and external electrodes on both end surfaces in a length direction perpendicular or substantially perpendicular to a stacking direction of the stack and connected to the internal electrode layers, the external electrodes each including an underlying electrode layer and a first plating layer on an outer periphery of the underlying electrode layer, and joints on one of main surfaces in the stacking direction of the capacitor body and connected to the external electrodes, the joints each mainly including a metal with a melting point of about 240° C. or higher, wherein second plating layers each extend continuously on an outer periphery of a corresponding one of the external electrodes and an outer periphery of a corresponding one of the joints.

Preferred embodiments of the present invention provide multilayer ceramic capacitors in each of which joints are not easily separated from a capacitor body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
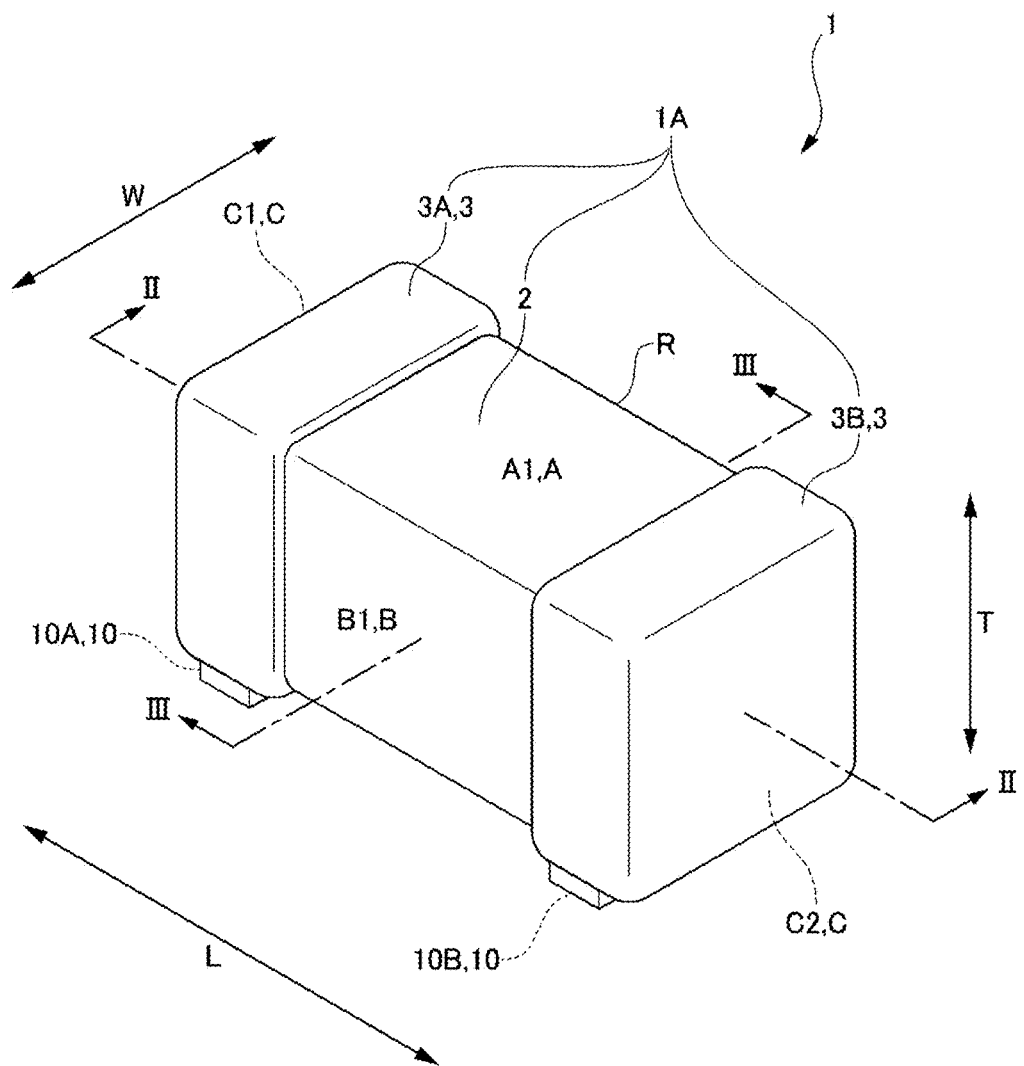
FIG. 1 is a schematic perspective view of a multilayer ceramic capacitor 1.
Figure 2:
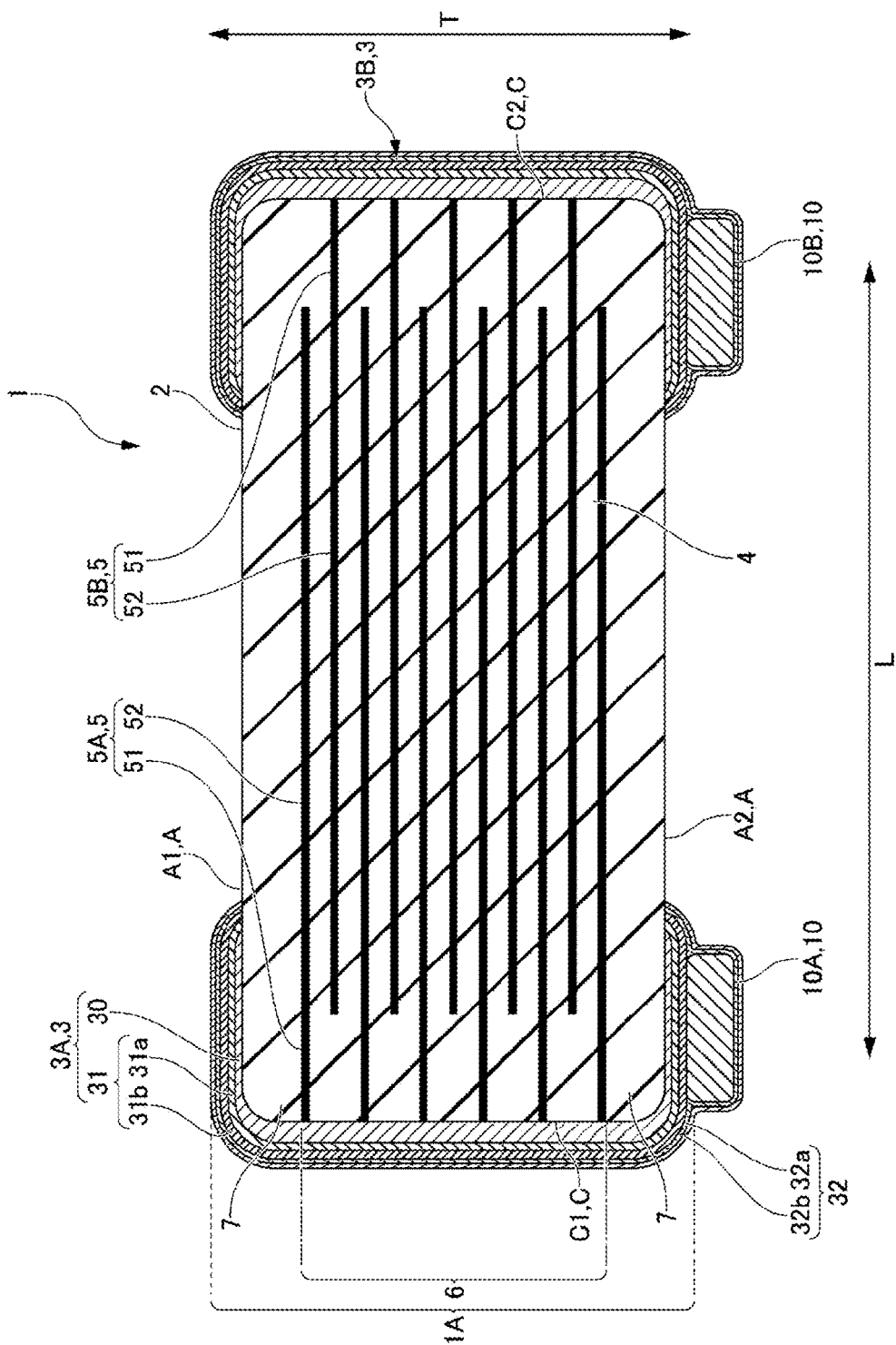
FIG. 2 is a cross-sectional view taken along line II-II of the multilayer ceramic capacitor 1 shown in FIG. 1.
Figure 3:
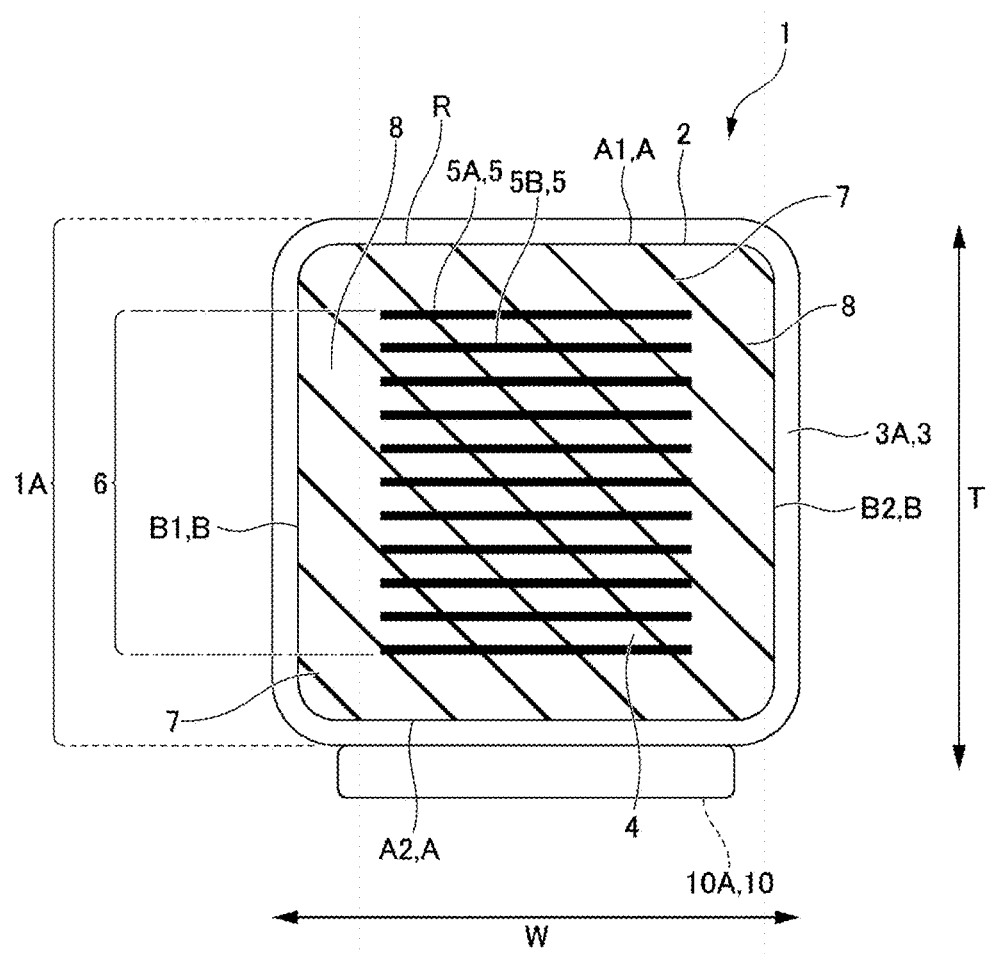
FIG. 3 is a cross-sectional view taken along line III-III of the multilayer ceramic capacitor 1 shown in FIG. 1.

Hereinafter, preferred embodiments of the present invention are described. FIG. 1 is a schematic perspective view of a multilayer ceramic capacitor 1. FIG. 2 is a cross-sectional view taken along line II-II of the multilayer ceramic capacitor 1 shown in FIG. 1. FIG. 3 is a cross-sectional view taken along line III-III of the multilayer ceramic capacitor 1 shown in FIG. 1.

The multilayer ceramic capacitor 1 is cuboidal or substantially cuboidal and includes a capacitor body 1A including a stack 2 and a pair of external electrodes 3 on both ends of the stack 2, and joints 10 attached to the capacitor body 1A. The stack 2 includes an inner layer portion 6 including multiple pairs of layers each including a dielectric layer 4 and an internal electrode layer 5.

In the following description, the orientation of the multilayer ceramic capacitor 1 is expressed by the following terms: a length direction L for a direction in which the pair of external electrodes 3 is disposed, a stacking direction T for a direction in which the dielectric layers 4 and the internal electrode layers 5 are stacked, and a width direction W for a direction intersecting both the length direction L and the stacking direction T. In the present preferred embodiment, the width direction W is perpendicular or substantially perpendicular to both the length direction L and the stacking direction T.

Among six outer surfaces of the stack 2, a first main surface A1 and a second main surface A2 define a pair of outer surfaces opposite to each other in the stacking direction T, a first side surface B1 and a second side surface B2 define a pair of outer surfaces opposite to each other in the width direction W, and a first end surface C1 and a second end surface C2 define a pair of outer surfaces opposite to each other in the length direction L. FIG. 2 shows a cross section passing through a central portion in the width direction W and extending in the stacking direction T and the length direction L.

When no distinction is required between the first main surface A1 and the second main surface A2 for description, these main surfaces are collectively described as main surfaces A. When no distinction is required between the first side surface B1 and the second side surface B2 for description, these side surfaces are collectively described as side surfaces B. When no distinction is required between the first end surface C1 and the second end surface C2 for description, these end surfaces are collectively described as end surfaces C.

Stack 2

The stack 2 includes the inner layer portion 6, outer layer portions 7 on the inner layer portion 6, adjacent to the respective main surfaces A, and side gap portions 8. Preferably, the stack 2 includes rounded ridges R. Each ridge R is where two surfaces of the stack 2 meet. Specifically, the ridges R include portions where one of the main surfaces A and one of the side surfaces B meet, portions where one of the main surfaces A and one of the end surfaces C meet, and portions where one of the side surfaces B and one of the end surfaces C meet, as well as corners where one of the main surfaces A, one of the side surfaces B, and one of the end surfaces C meet.

Inner Layer Portion 6

The inner layer portion 6 includes the dielectric layers 4 and the internal electrode layers 5 stacked alternately in the stacking direction T. The dielectric layers 4 and the internal electrode layers 5 include multiple pairs of layers each including the dielectric layer 4 and the internal electrode layer 5.

Dielectric Layer 4

The dielectric layer 4 is made of a ceramic material. Examples of the ceramic material include a dielectric ceramic mainly including $BaTiO_3$ as a main component. The ceramic material may also be one in which at least one accessory component selected from the group including a Mn compound, a Fe compound, a Cr compound, a Co compound, and a Ni compound is added to the main component of the ceramic material.

Internal Electrode Layer 5

Preferably, the internal electrode layers 5 are made of a metal material such as Ni, Cu, Ag, Pd, Ag—Pd alloy, or Au.

The internal electrode layers 5 include multiple first internal electrode layers 5A and multiple second internal electrode layers 5B. The first internal electrode layers 5A and the second internal electrode layers 5B alternate each other. When no distinction is required between the first internal electrode layers 5A and the second internal electrode layers 5B for description, these internal electrode layers are collectively described as internal electrode layers 5.

Each internal electrode layer 5 includes a facing portion 52 facing another facing portion 52 of an adjacent electrode layer 5 between the first internal electrode layer 5A and the second internal electrode layer 5B, and a lead-out portion 51 not facing another lead-out portion 51 of an adjacent electrode layer 5 between the first internal electrode layer 5A and the second internal electrode layer 5B. The lead-out portions 51 are led out from the respective facing portions 52 toward the respective end surfaces C. An end of each lead-out portion 51 is exposed at the corresponding end surface C and electrically connected to the corresponding external electrode 3. The lead-out portions 51 extend in different directions between the first internal electrode layers 5A and the second internal electrode layers 5B and are led out toward the first end surface C1 and the second end surface C2 in an alternate manner. An electric charge builds up between the facing portion 52 of each first internal electrode layer 5A and the facing portion 52 of the second internal electrode layer 5B adjacent to the first internal electrode layer 5A in the stacking direction T, whereby a function as a capacitor is achieved.

Outer Layer Portion 7

The outer layer portions 7 are on the inner layer portion 6, adjacent to the respective main surfaces A. The outer layer portions 7 are made of the same material as those of the dielectric layers 4 of the inner layer portion 6.

Side Gap Portion 8

The side gap portions 8 are on the inner layer portion 6, adjacent to the respective side surfaces B of the stack 2. The side gap portions 8 are made of the same material as those of the dielectric layers 4 and formed in an integrated manner.

External Electrode 3

The external electrodes 3 are on both end surfaces C of the stack 2. The external electrodes 3 cover not only the end surfaces C but also portions, which are adjacent to the end surfaces C, of the main surfaces A and the side surfaces B. Each external electrode 3 includes an underlying electrode layer 30 and a first plating layer 31 on an outer periphery of the underlying electrode layer 30.

Underlying Electrode Layer 30

The underlying electrode layers 30 are electrically connected to ends of the lead-out portions 51, which are exposed at the respective end surfaces C, of the internal electrode layers 5. In the present preferred embodiment, the underlying electrode layers 30 are baked electrodes obtained, for example, by firing a conductive paste including a conductive metal such as Cu, Ni, Ag, Pd, Ag—Pd alloy, or Au.

First Plating Layer 31

Each first plating layer 31 includes a first Ni plating layer 31a covering the underlying electrode layer 30 on an outer periphery of the underlying electrode layer 30 and a first Sn plating layer 31b covering the first Ni plating layer 31a on an outer periphery of the first Ni plating layer 31a. Each first Ni plating layer 31a is made of nickel plating or nickel-including alloy plating. Each first Sn plating layer 31b is made of Sn plating or Sn-including alloy plating.

Joint 10

The joints 10 include a pair of joints, i.e., a first joint 10A and a second joint 10B. Hereinafter, when no distinction is required between the first joint 10A and the second joint 10B for description, these joints are collectively described as the joints 10.

The first joint 10A and the second joint 10B are adjacent to the main surface A2 of the capacitor body 1A. The first joint 10A is at one end, and the second joint 10B is at the other end in the length direction L. The first joint 10A and the second joint 10B have the same shape, i.e., a rectangular or substantially rectangular shape, and face each other with a predetermined distance therebetween.

The joints 10 each mainly include a metal with a melting point of about 240° C. or higher, for example. In the present preferred embodiment, for example, the joints 10 are made with high temperature solder. The high temperature solder is a metal with a re-melting temperature of about 300° C. or higher, such as Sn, Ag, and Cu. Once melted at about 200° C. or higher and then hardened by cooling, the high temperature solder will not re-melt unless it is heated at about 300° C. or higher, for example. The high temperature solder is not limited thereto, and it may be Sn—Sb-based high temperature solder, for example.

The joints 10 may mainly include an intermetallic compound which mainly includes at least one high melting point metal with a melting point of about 240° C. or higher selected from Cu and Ni and which also includes Sn as a low melting point metal, for example. The joints mainly including such an intermetallic compound with a melting point such that no melting occurs even at a soldering temperature and can be easily arranged in a desired form.

Preferably, the intermetallic compound is an intermetallic compound produced by a reaction between Sn and Cu—Ni alloy. Advantageously, such an intermetallic compound can be produced at a high reaction rate and is less likely to be deformed. The intermetallic compound may also contain Ag as a high melting point metal. Herein, the expression "mainly including" indicates a content of at least about 50%, for example.

Although not shown, a mounting-side surface of each joint 10 includes irregularities.

Second Plating Layer 32

The outer peripheries of the external electrodes 3 and the outer peripheries of the joints 10 are covered by second plating layers 32, with the joints 10 attached to the external electrodes 3.

Each second plating layer 32 includes a second Ni plating layer 32a and a second Sn plating layer 32b covering the second Ni plating layer 32a on an outer periphery of the second Ni plating layer 32a. As is the case with the first Ni plating layer 31a, each second Ni plating layer 32a is made of nickel plating or nickel-including alloy plating. As is the case with the first Sn plating layer 31b, each second Sn plating layer 32b is made of Sn plating or Sn-including alloy plating.

The second Sn plating layers 32b each have a smoother surface than the first Sn plating layers 31b. In other words, the first Sn plating layers 31b each have a higher surface roughness than the second Sn plating layers 32b. The term "surface roughness" herein refers to the surface roughness Rz that is a height parameter called "maximum height". The surface roughness Rz is the sum of a maximum peek height value and a maximum valley depth value as determined from a portion extracted at a reference length from a roughness curve obtained using a roughness meter. The first Sn plating layers 31b are thicker than the second Sn plating layers 32b.

As described above, the mounting-side surface of each joint 10 includes irregularities. The second plating layers 32 are formed conforming to the shapes of the irregularities of the respective joints 10, which further increases the bonding between the joints 10 and the second plating layers 32 by the anchor effect.

Method of Producing Multilayer Ceramic Capacitor 1

Figure 4:
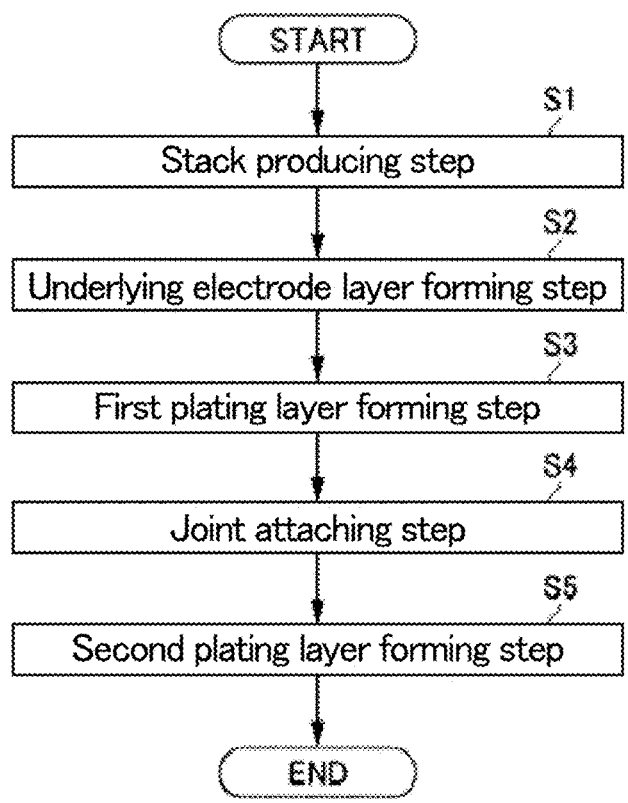
FIG. 4 is a flow chart that describes a method of producing the multilayer ceramic capacitor 1.

Next, a non-limiting example of a method of producing the multilayer ceramic capacitor 1 according to the present preferred embodiment is described. FIG. 4 is a flow chart that describes a method of producing the multilayer ceramic capacitor 1.

Steps of producing the multilayer ceramic capacitor 1 include a stack producing step S1, an underlying electrode layer forming step S2, a first plating layer forming step S3, a joint attaching step S4, and a second plating layer forming step S5.

Stack Producing Step S1

First, in the stack producing step S1, ceramic slurry is formed into sheets to provide ceramic green sheets for stacking, and patterns of the internal electrode layers 5 are printed with a conductor paste on the ceramic green sheets for stacking, whereby material sheets are provided.

Then, multiple material sheets are stacked into a stacked sheet such that the internal electrode patterns are shifted by half pitch in the length direction between adjacent material sheets.

Further, ceramic green sheets for outer layer portions, which will be formed into the outer layer portions, are overlaid on both sides of the stacked sheet of multiple material sheets, followed by thermocompression bonding, whereby a mother block member is formed.

The mother block member is cut along cutting lines corresponding to dimensions of stacks, whereby multiple stacks 2 are produced.

Underlying Electrode Layer Forming Step S2

Next, in the underlying electrode layer forming step S2, the underlying electrode layers 30 are formed on both ends of each stack 2. The underlying electrode layers 30 are formed by, for example, applying a conductive paste including a conductive metal and glass to the ends of each stack 2 and baking the paste. As shown in FIG. 2, the underlying electrode layers 30 are formed on the end surfaces C at both ends of the stack 2 and also extend toward the main surfaces A to cover portions, which are adjacent to the end surfaces C, of the main surfaces A.

First Plating Layer Forming Step S3

In the first plating layer forming step S3, first, the first Ni plating layer 31a is formed on the outer periphery of each underlying electrode layer 30 to cover the underlying electrode layer 30. Then, the first Sn plating layer 31b is formed on the outer periphery of each first Ni plating layer 31a to cover the first Ni plating layer 31a. The capacitor body 1A including the external electrodes 3 on the stack 2 is produced by the above steps.

Joint Attaching Step S4

In the joint attaching step S4, the joints 10 are formed on the outer peripheries of the external electrodes 3 adjacent to the second main surface A2 of the capacitor body 1A. The joints 10 are formed by applying a metal with a melting point of about 240° C. or higher, for example, such as high temperature solder, on the outer peripheries of the underlying electrode layers 30.

When using high temperature solder, the high temperature solder is first melted at about 200° C. or higher and applied in a liquid state to a surface of each first Sn plating layer 31b. At this point, the first Sn plating layers 31b each have a rougher surface than the second Sn plating layers 32b. Thus, the surface of each first Sn plating layer 31b includes more irregularities than the surface of each second Sn plating layer 32b. The melted, liquid, and high temperature solder flows into the irregularities on the surface of each first Sn plating layer 31b, and each joint 10 made with the high temperature solder is strongly adhered to the first Sn plating layer 31b.

Here, the surfaces of the underlying electrode layers 30 are covered by the first Ni plating layers 31a. Thus, when the high temperature solder is applied to the capacitor body 1A to form the joints 10, the underlying electrode layers 30 are prevented from being corroded by the solder.

In addition, the first Sn plating layers 31b are on the outer peripheries of the first Ni plating layers 31a. This improves the wettability of the high temperature solder when the solder is applied to form the joints 10, allowing the joints 10 to be easily attached.

Second Plating Layer Forming Step S5

In the second plating layer forming step S5, the second plating layers 32 are formed on the outer peripheries of the external electrodes 3 and the outer peripheries of the joints 10. The second plating layers 32 continuously and integrally cover portions where the first Sn plating layers 31b are exposed at the respective external electrodes 3 excluding where the joints 10 are attached, and the outer peripheries of the joints 10.

The second plating layers 32 are preferably formed as described below, for example.

First, each second Ni plating layer 32a is continuously and integrally formed at a portion where the first Sn plating layer 31b is exposed at the corresponding external electrode 3 excluding where the joint 10 is attached, and the outer periphery of the corresponding joint 10.

Then, each second Sn plating layer 32b is formed on the outer periphery of the corresponding second Ni plating layer 32a to cover the second Ni plating layer 32a.

The multilayer ceramic capacitor 1 is produced by the above steps.

As described above, in the multilayer ceramic capacitor 1 of the present preferred embodiment, the second plating layers 32 each extend continuously on the outer periphery of the corresponding external electrode 3 where the first plating layer 31 is formed, and the outer periphery of the corresponding joint 10. Specifically, the joints 10 in a state of being attached to the capacitor body 1A are covered by the second plating layers 32 in an integrated manner with the external electrodes 3 of the capacitor body 1A. Since the second plating layers 32 cover the outer peripheries of the external electrodes 3 of the capacitor body 1A including the joints 10, the joints 10 are not easily separated from the capacitor body 1A.

Common solder (hereinafter referred to as the lower temperature solder) having a lower melting temperature than high temperature solder is used when mounting the multilayer ceramic capacitor 1 onto a substrate. At the time of mounting, when the surface roughness of the second Sn plating layer 32b is too high, the lower temperature solder does not easily travel up the side surfaces of the joints 10 covered by the second Sn plating layers 32b, so that solder fillets are not easily formed.

However, in the present preferred embodiment, the second Sn plating layers 32b each have a smoother surface than the first Sn plating layers 31b. Thus, the lower temperature solder easily travels up the side surfaces of the joints 10 covered by the second Sn plating layers 32b, so that solder fillets are easily formed. This stabilizes the mounting of the multilayer ceramic capacitor 1 onto the substrate.

The first Sn plating layers 31b each have a rougher surface than the second Sn plating layers 32b. A certain thickness is required to roughen the surface of the first Sn plating layer 31b as described above. Thus, the first Sn plating layers 31b are made thicker than the second Sn plating layers 32b.

Meanwhile, the second Sn plating layers 32b are made thinner than the first Sn plating layers 31b to allow the second Sn plating layers 32b to have smoother surfaces than the first Sn plating layers 31b.

Since the second Ni plating layers 32a cover the outer peripheries of the external electrodes 3 and the outer peripheries of the joints 10, the external electrodes 3 and the joints 10 are prevented from being corroded by the lower temperature solder when the solder is applied.

Each second Sn plating layer 32b is on the outer periphery of the corresponding second Ni plating layer 32a. Thus, the wettability of the lower temperature solder increases when the multilayer ceramic capacitor 1 is mounted on a substrate, which facilitates mounting.

Preferred embodiments of the present invention have been described above.

A multilayer ceramic capacitor according to a preferred embodiment of the present invention includes a capacitor body including a stack of alternating dielectric layers and internal electrode layers, and external electrodes on both end surfaces in a length direction perpendicular or substantially perpendicular to a stacking direction of the stack and connected to the internal electrode layers, the external electrodes each including an underlying electrode layer and a first plating layer on an outer periphery of the underlying electrode layer, and joints on one of main surfaces in the stacking direction of the capacitor body and connected to the external electrodes, the joints each mainly including a metal with a melting point of about 240° C. or higher, wherein second plating layers each extend continuously on an outer periphery of a corresponding one of the external electrodes and an outer periphery of a corresponding one of the joints.

In a multilayer ceramic capacitor according to a preferred embodiment of the present invention, each of the first plating layers includes a first Ni plating layer and a first Sn plating layer, and each of the second plating layers includes a second Ni plating layer and a second Sn plating layer.

In a multilayer ceramic capacitor according to a preferred embodiment of the present invention, the first Sn plating layer has a higher surface roughness than the second Sn plating layer.

In a multilayer ceramic capacitor according to a preferred embodiment of the present invention, the first Sn plating layer is thicker than the second Sn plating layer.

However, the present invention is not limited to the above-described preferred embodiments of the present invention, and various changes can be made.

For example, in the preferred embodiments, the second plating layers 32 covering the joints 10 each include the second Ni plating layer 32a and the second Sn plating layer 32b. However, the present invention is not limited thereto, and the second plating layers 32 may each include only the second Sn plating layer 32b. Yet, the joints 10 are further less likely to be separated from the capacitor body 1A when the second plating layers 32 each include the second Ni plating layer 32a and the second Sn plating layer 32b than when the second plating layers 32 each include only the second Sn plating layer 32b.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a capacitor body including a stack of alternating dielectric layers and internal electrode layers, and external electrodes on both end surfaces in a length direction perpendicular or substantially perpendicular to a stacking direction of the stack and connected to the internal electrode layers, the external electrodes each including an underlying electrode layer and a first plating layer on an outer periphery of the underlying electrode layer; and
joints on one of main surfaces in the stacking direction of the capacitor body and connected to the external electrodes; wherein
each of the first plating layers includes a first Ni plating layer and a first Sn plating layer between the first Ni plating layer and a corresponding one of the joints;
a second Ni plating layer extends continuously on an outer periphery of the first Sn plating layer and an outer periphery of the corresponding one of the joints; and
a second Sn plating layer is on the second Ni plating layer.

2. The multilayer ceramic capacitor according to claim 1, wherein the first Sn plating layer has a higher surface roughness than the second Sn plating layer.

3. The multilayer ceramic capacitor according to claim 1, wherein the first Sn plating layer is thicker than the second Sn plating layer.

4. The multilayer ceramic capacitor according to claim 1, wherein the capacitor body is cuboidal or substantially cuboidal.

5. The multilayer ceramic capacitor according to claim 1, wherein the capacitor body includes rounded ridges.

6. The multilayer ceramic capacitor according to claim 1, wherein each of the dielectric layers includes $BaTiO_3$ as a main component.

7. The multilayer ceramic capacitor according to claim 6, wherein each of the dielectric layers includes a Mn compound, a Fe compound, a Cr compound, a Co compound, or a Ni compound as an accessory component.

8. The multilayer ceramic capacitor according to claim 1, wherein each of the internal electrode layers includes Ni, Cu, Ag, Pd, Ag—Pd alloy, or Au.

9. The multilayer ceramic capacitor according to claim 1, wherein the capacitor body includes side gap portions adjacent to side surfaces of the capacitor body.

10. The multilayer ceramic capacitor according to claim 1, wherein each of the underlying electrode layers includes Cu, Ni, Ag, Pd, Ag—Pd alloy, or Au.

11. The multilayer ceramic capacitor according to claim 1, wherein the joints have a same shape or substantially a same shape.

12. The multilayer ceramic capacitor according to claim 1, wherein each of the joints has a rectangular or substantially rectangular shape.

13. The multilayer ceramic capacitor according to claim 1, wherein each of the joints includes solder.

14. The multilayer ceramic capacitor according to claim 1, wherein
the joints each mainly include a metal with a melting point of about 240° C. or higher; and
the metal of the joints has a re-melting temperature of about 300° C. or higher.

15. The multilayer ceramic capacitor according to claim 1, wherein each of the joints includes Sn—Sb-based high temperature solder.

16. The multilayer ceramic capacitor according to claim 1, wherein each of the joints includes an intermetallic compound.

17. The multilayer ceramic capacitor according to claim 16, wherein the intermetallic compound includes Sn and a Cu—Ni alloy.

18. The multilayer ceramic capacitor according to claim 16, wherein the intermetallic compound includes Ag.

* * * * *